Aug. 24, 1965            J. B. JONES            3,201,865
PROCESS FOR PROSITIONING AND SPLICING WEBS
Original Filed March 25, 1959            9 Sheets-Sheet 1
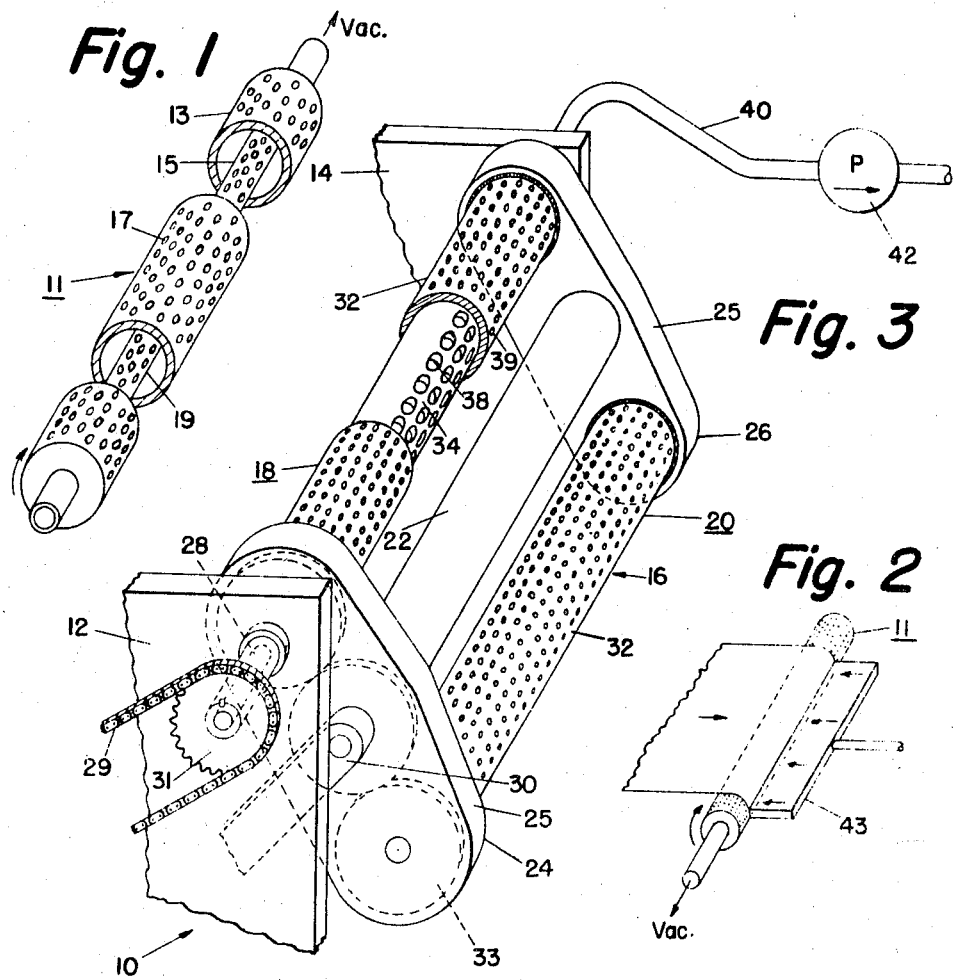
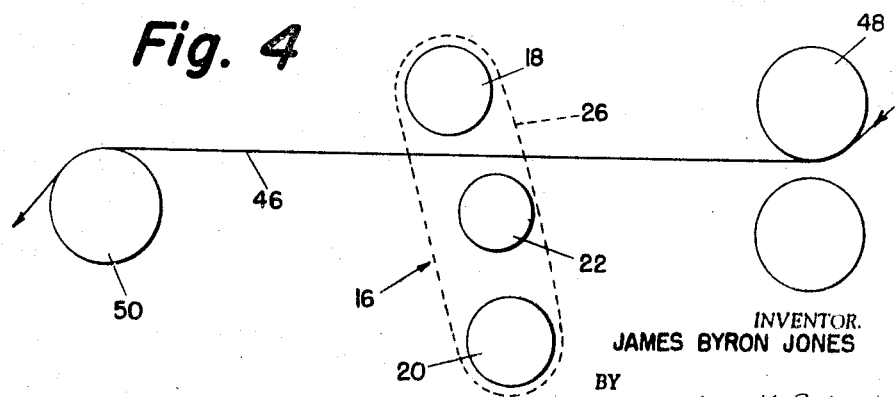
INVENTOR.
JAMES BYRON JONES
BY
ATTORNEY

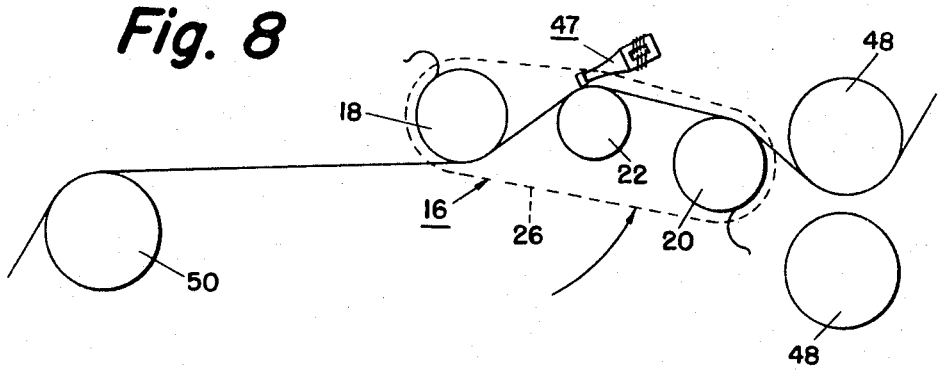
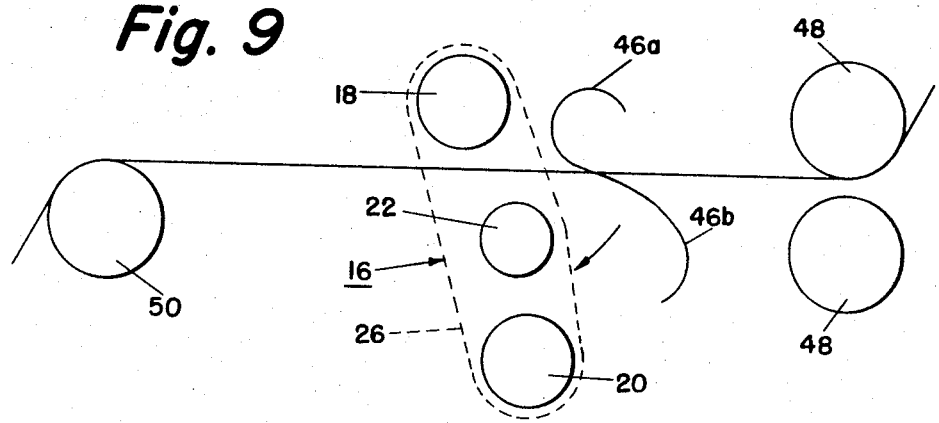
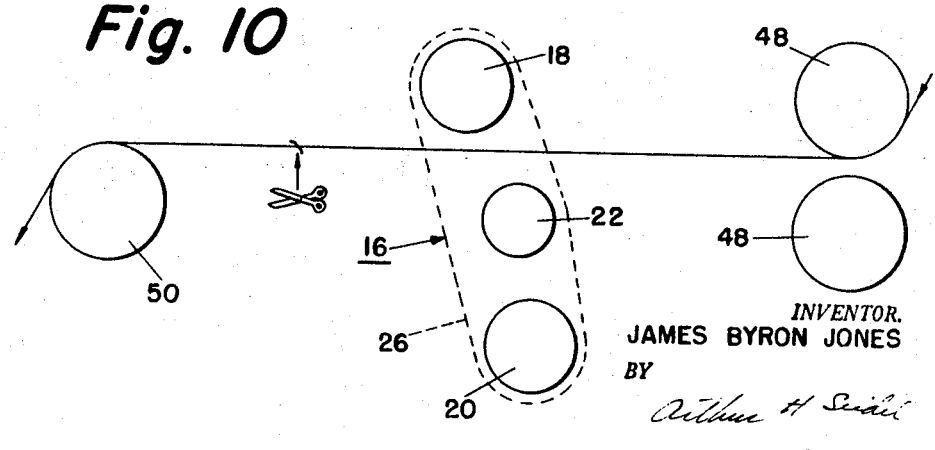

Aug. 24, 1965  J. B. JONES  3,201,865
PROCESS FOR PROSITIONING AND SPLICING WEBS
Original Filed March 25, 1959  9 Sheets-Sheet 4

INVENTOR.
JAMES BYRON JONES
BY
ATTORNEY

INVENTOR.
JAMES BYRON JONES

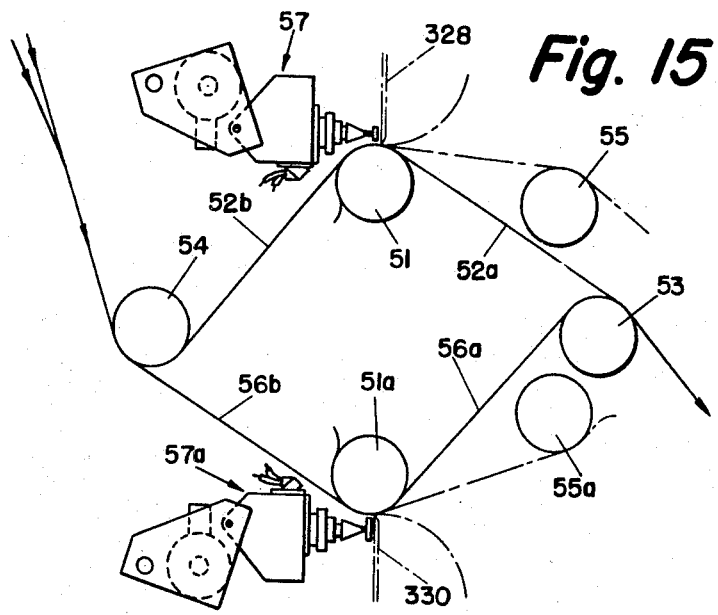
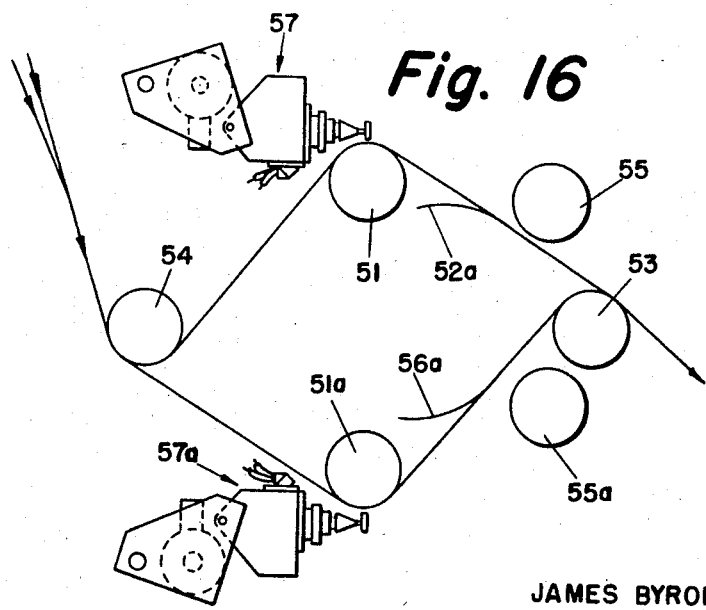

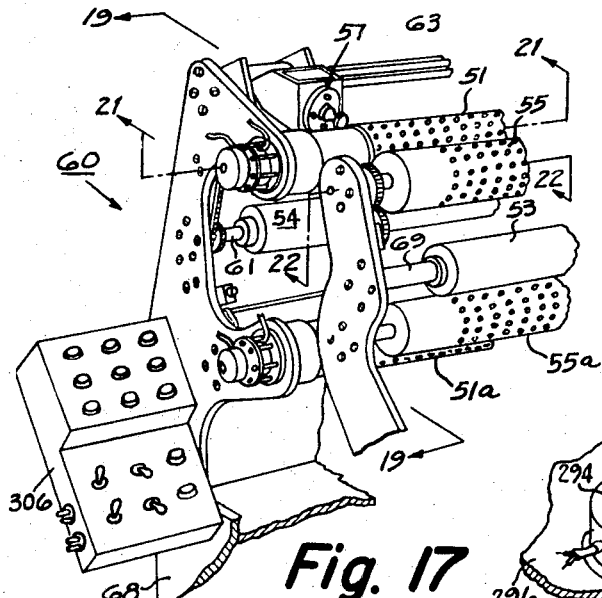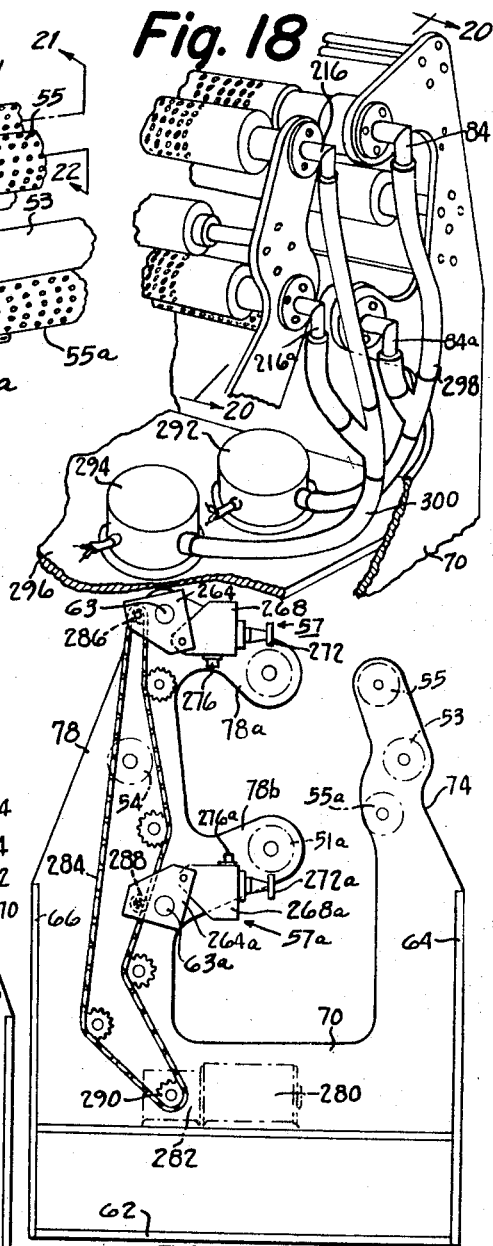

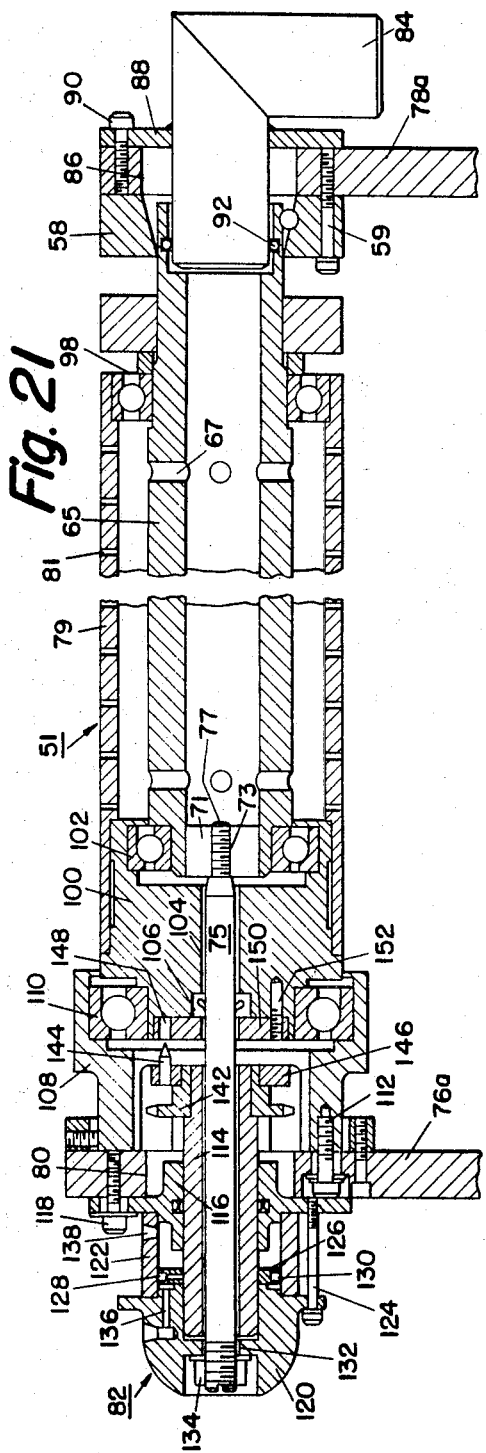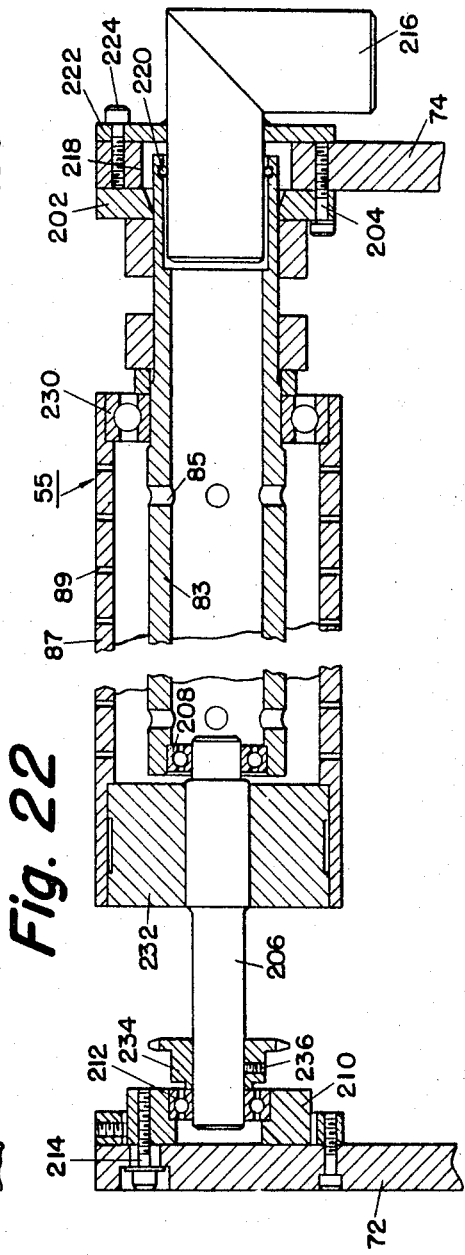

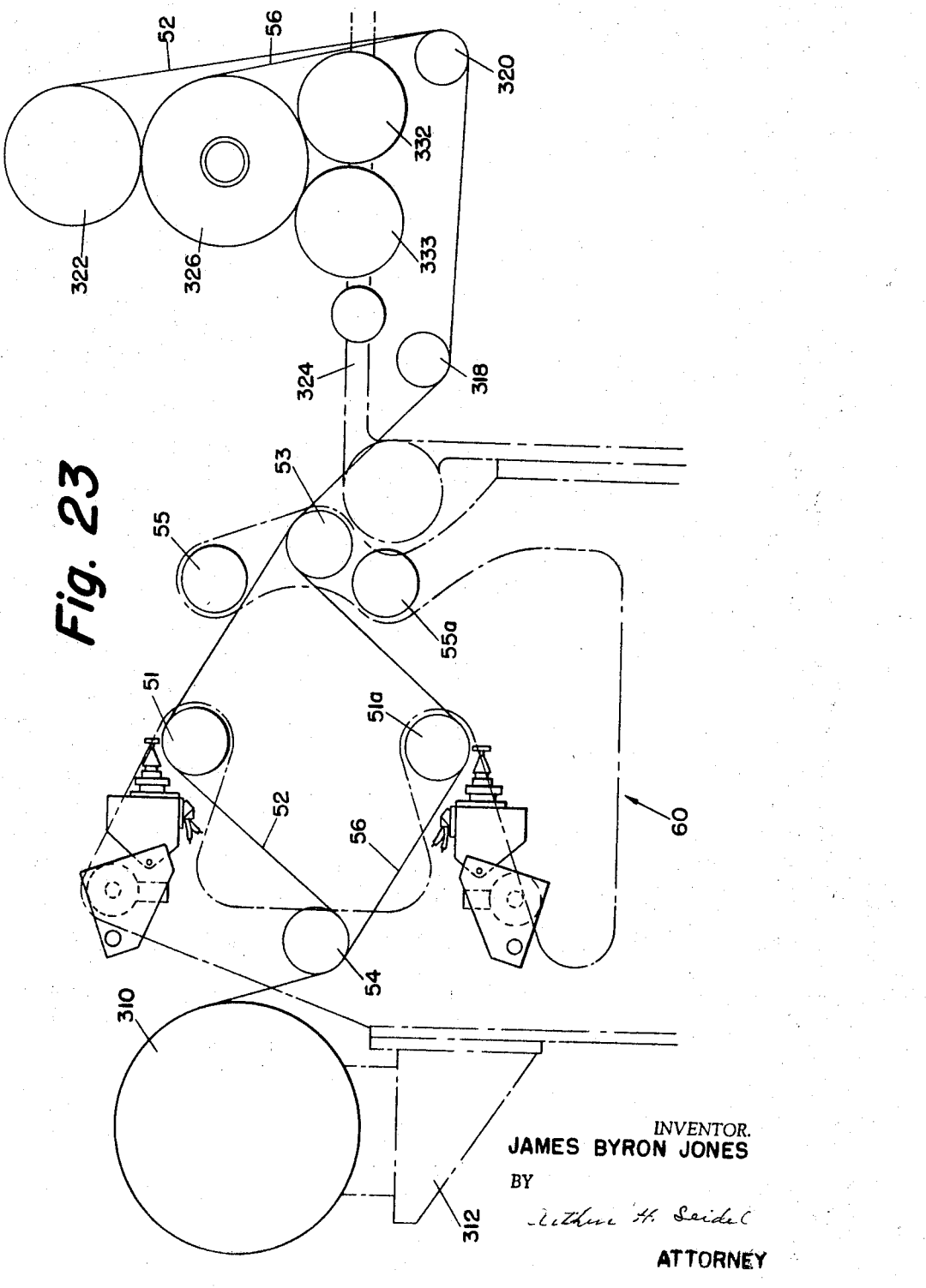

3,201,865
PROCESS FOR POSITIONING AND SPLICING WEBS
James Byron Jones, West Chester, Pa., assignor, by mesne assignments, to Sonobond Corporation, West Chester, Pa., a corporation of Pennsylvania
Original application Mar. 25, 1959, Ser. No. 801,889, now Patent No. 3,132,544, dated May 12, 1964. Divided and this application Mar. 21, 1963, Ser. No. 267,054
15 Claims. (Cl. 29—493)

This application is a division of application Serial No. 801,889 filed on March 25, 1959, now U.S. Patent No. 3,132,544, which is a continuation-in-part of United States patent application Serial No. 747,512 filed July 10, 1958, now abandoned, in the name of James Byron Jones, entitled, "Positioning and Splicing Apparatus and Process for Positioning and Splicing Webs."

The present invention relates to a process for positioning and splicing webs of material.

In the manufacture of metal foil, particularly aluminum foil which usually comprises a range of thicknesses of from 0.00017 inch up to about 0.006 inch and a range of width of from a few inches up to more than six feet, various operations are carried out, depending upon the end use of the material. Briefly, the aluminum foil is rolled to its final thickness in metal rolling mills which comprise no part of this invention. The output of such rolling mills is ordinarily foil in a work-hardened condition and in random lengths and with more or less rough edges. The metal foil in its final rolling-mill-output thickness is usually wound onto a metal tube or rod, in the course of which winding the foil may or may not be sheared to some fixed width, which is slightly less than the width to which the foil was rolled in the rolling mill, so as to eliminate rough and ragged edges. However, the several ends or lengths may not be attached together, so that the roll of foil is not a continuous length but may incorporate from a few to a large number of disconnected ends or lengths.

This roll of foil is then wound onto another roll, in the course of which winding the various disconnected ends or lengths are usually attached together, making a continuous web, and the foil may be sheared to one or many widths to satisfy the requirements for the end uses of the foil. This operation is normally carried out on a machine called a "rewind-shear."

Moreover, the lighter or thinner gages of aluminum foil are not usually processed as a single-ply foil-rolling operation. A relatively small amount of this type of metal, having a relatively low value per square foot, usually goes through the rolling mills, so that rolling single-ply material to very thin gages is sometimes not worthwhile. Accordingly, foil manufacturers normally produce two layers of the thinner gages of foil simultaneously with their rolling mills, the product being called "pack foil." Pack foil can be readily identified by anyone, because it has one shiny side and one dull or mat finish side. The shiny sides contacted the rolls in the rolling mill, whereas the dull sides contacted the other ply of foil that was being rolled simultaneously.

Thus, the output of a foil rolling mill, particularly when the lighter or thinner gages are being manufactured, is usually a two-ply material. This two-ply material is removed from the rolling mills as a roll of foil made of random lengths which are not joined together. This roll of foil, as for the single-ply foil previously mentioned, is then wound onto another roll, in the course of which winding the various discrete ends or lengths are usually attached together. In this case, however, it is the individual plies making up the pack foil web that are end-connected or spliced, but they must not be bonded in any way to the adjacent ply of foil. This operation, which is also carried out on a rewind-shear, usually includes the following steps: (1) it shears the foil into one or many widths to satisfy the requirements for the end uses of the foil, (2) it separates the two plies of foil from the supply roll and winds the plies on separate rolls, (3) the ends of each of the discrete webs are spliced as necessary during the operation. The winding onto separate takeup rolls is necessary because foil is not usually sold to converters, i.e., commercial firms conducting job operations which take the output of the foil manufacturer and laminate it onto paper backing, print designs upon it, etc., in the pack condition.

The method used to connect the several ends together that are existent on the supply roll, usually called the "unwind roll," or to repair breaks in the web which sometimes occur in the rewind-shear operation, is most important.

For metals in the thickness range mentioned above, namely, 0.00017-inch to 0.006-inch, it is clear that metal-joining means, such as rivets, bolts and nuts, staples, etc., are generally unsatisfactory. Moreover, electrical resistance welding in such thin metals is also generally unsatisfactory as it produces myriads of pinpoint-like welds, which are brittle, and burned areas. Aluminum foil is especially difficult to weld electrically as the surface resistance, produced by mill conditions and the normal aluminum oxide coating, is erratic and difficult to control. Pressure welding, which requires clean surfaces and involves exceedingly high deformations to accomplish good junctions and is often very slow, offers evident disadvantages for foil splicing, although crimping (knurl splicing or manual embossing) is sometimes used to join lapped ends of foil plies, though it is prone to "tender" the foil and makes a conspicuous splice band whose strength is not always adequate for end-use requirements. Other common metal-joining means, such as arc welding, gas welding, etc., are not generally practical, as they are prone to burn the foil. Soldering and brazing such very thin materials leave bulky stiff joints and areas of dissolution of the parent metal and are therefore usually impractical. The only reasonable practical methods for effecting splicing prior to the present invention have been embossing or adhesive bonding.

Objections to the use of adhesives may be enumerated as follows: (1) The operator requires a high degree of skill and reliability, because a drop of residual adhesive in the roll (or slopping over the edges and sticking to the next ply of foil) can, the first time it goes through a high speed machine, cause complete havoc. Current practice is to have each operator who has made a splice credited with that splice, with records of such splices and their history being kept all the way through to the customer's plant. Any improper splice which causes trouble can be traced back to the operator who made it, and he can be retrained in the adhesive technique of foil splicing. (2) Adhesive joints cannot be adequately inspected. (3) Joints made with adhesives must have a fairly wide lap to insure a fair reliability. (4) The adhesive used produces a slight thickening and a zone of increased stiffness which often produces trouble in end-use manufacturing. (5) Many adhesives cannot withstand annealing temperatures, which are often necessary subsequent to rolling since aluminum foil is not usually used in the "hard-rolled" condition, so that frequently adhesive joints are of very dubious quality after the annealing operation. (6) Adhesive joints preclude electrical continuity which is essential in many new applications for foil, such as foil coils, etc.

Moreover, in the various end-uses to which foil is put (e.g., it may be laminated to paper backing as is common for chewing gum wrappers, cigarette packages, wrapping of cards, etc.; it may be decoratively printed and run through various types of high speed coating machinery; etc.), the high speed end-use equipment does not treat the foil gently. Thus, any weak splice may fail, and failure of a splice or breakage of the web in such operations as laminating, printing, etc., creates complicated problems and expensive and time-consuming interruptions in the user's operations. Such a shut-down of, say, a coating apparatus where wet ink or paint is associated with the process may entail hours of "downtime" of expensive equipment. It can be seen, then, that breakage of metal webbing such as has been described can be exceedingly costly.

Hence, the optimum splice in a roll of metal foil, and especially in aluminum foil, is a metallurgical joint; i.e., a welded joint, of high reliability, very low deformation, extreme unobstrusiveness, and one manufactured under conditions relatively free from operator skills and training, accomplished by a metal-joining process largely independent of metal surface condition, and one which can be effected quickly and reliably.

In addition to the problem of accomplishing a metallurgical joint which is uniform from edge to edge, e.g., which produces no damage where the junction starts or where it finishes or at any point in between, since edge damage almost certainly results in a tear starting at the defect, there is the associated problem of positioning and smoothing of the webs at the zones of the intended splice. In the splicing of metal foil, it is advisable that the two disconnected web ends which are to be spliced together be positioned between the unwind source and the take-up element in such fashion that, after the splice is accomplished, there will be a minimum of diagonal wrinkles or evidence of unequal tension, since such unequal tension may later cause the web to fail.

It is an object of the present invention to provide a novel method for effecting the splicing of foils, such as metal foils.

It is another object of the present invention to provide a novel method for simultaneously effecting the splicing of two separate webs of foil, such as metal foil.

It is another object of the present invention to provide continuous webs of foil spliced by a method providing electrical continuity in order that the material can find end use in electrical applications.

Other objects will appear hereinafter.

For the purpose of illustrating the invention there is shown in the drawings a form which is presently preferred; it being understood, however, that this invention is not limited to the precise arrangements and instrumentalities shown.

Referring to the drawings, wherein like reference characters refer to like parts:

FIGURE 1 is a perspective view, with parts being broken away to reveal underlying structure, of one embodiment of the positioning apparatus of the present invention.

FIGURE 2 is a perspective view of a web positioning roll of the present invention revealing the manner in which a web of foil is positioned therewith.

FIGURE 3 is a perspective view, with parts being broken away to reveal underlying structure, of another embodiment of the positioning apparatus of the present invention.

FIGURES 4 through 10 illustrate the various phases of an arrangement for positioning and splicing of single-ply webs in accordance with the present invention.

Thus, FIGURE 4 is a diagrammatic view representing a normal phase of operation utilizing a web passing from a feed roll to a takeup roll, in which the positioning apparatus of the present invention is disposed in ready position but is not in use.

Figure 5:
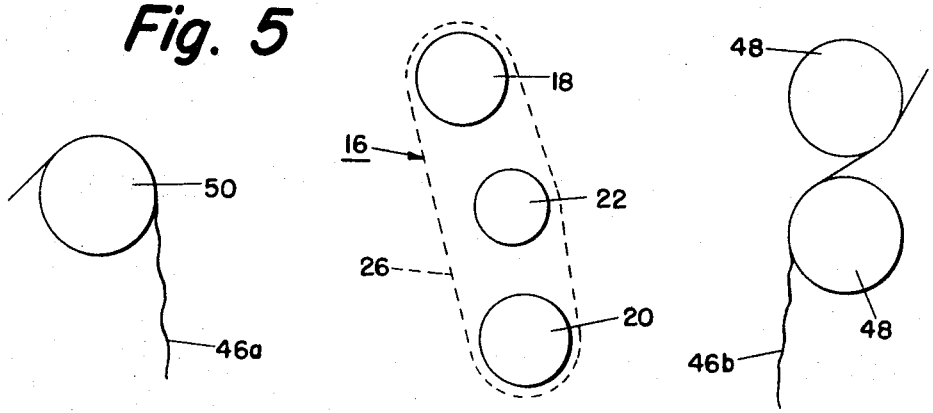

FIGURE 5 is a diagrammatic view revealing the phase of the process of the present invention when the web passing from the feed roll to the takeup roll becomes discontinuous or broken.

Figure 6:
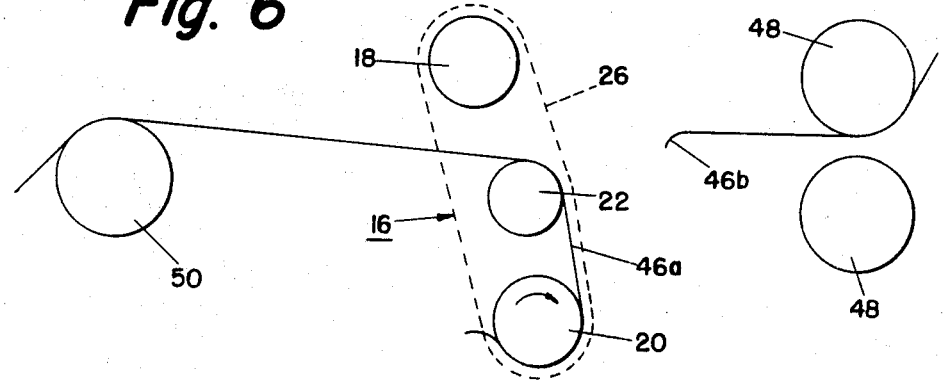

FIGURE 6 is a diagrammatic view revealing the stage in the process of the present invention when one of the discontinuous ends of the web is operatively secured in reference to the positioning apparatus of the present invention and the other discontinuous end of the web is maneuvered for operative securement to the positioning portion of the apparatus of the present invention.

Figure 7:
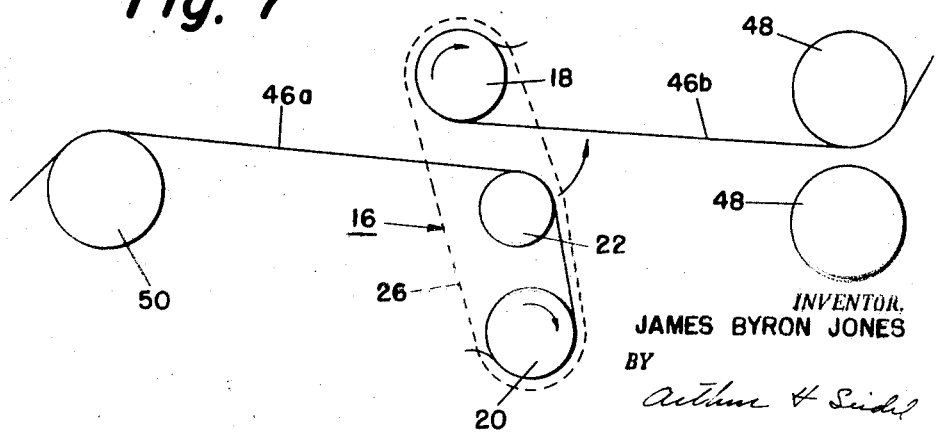

FIGURE 7 is a diagrammatic view revealing a later phase of the process of the present invention than is revealed in FIGURE 6, namely the phase in which both of the discontinuous ends of the web are operatively secured with respect to the positioning apparatus of the present invention.

FIGURE 8 is a diagrammatic view revealing a still later phase of the process of the present invention, namely the phase in which the apparatus of the present invention is pivoted so that joinder of the broken ends or discontinuous ends of the web upon the anvil may be achieved.

FIGURE 9 is a diagrammatic view of a later phase of the present invention than is shown in FIGURE 8, namely the phase in which the spliced web clears the apparatus of the present invention and is moved towards the takeup roll.

FIGURE 10 reveals the final phase of the process of the present invention for positioning and splicing singly-ply webs of foil, namely the removal of the tails from the spliced web.

FIGURES 11 through 16 illustrate the various phases of an arrangement for positioning and splicing pack, i.e., double-ply webs of foil in accordance with the present invention.

Figure 11:
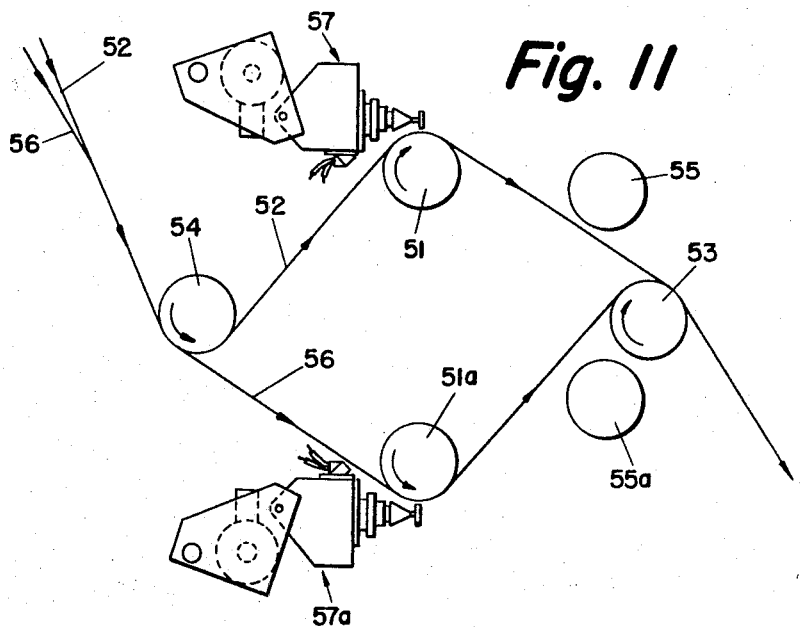

Thus, FIGURE 11 is a diagrammatic view showing the normal flow of pack (two-ply) foil through the apparatus of the present invention when there is no need for splicing.

Figure 12:
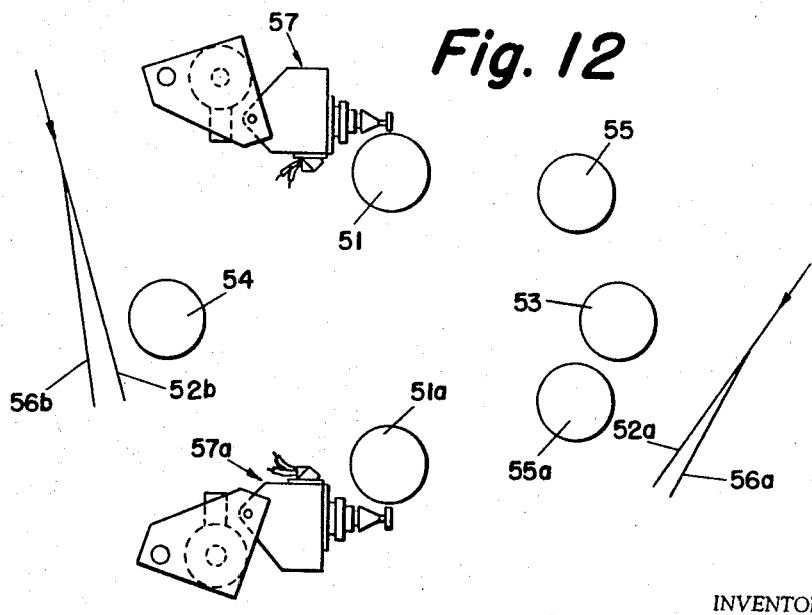

FIGURE 12 is a diagrammatic view revealing the phase of the procses of the present invention when the webs of pack foil become discontinuous or broken.

Figure 13:
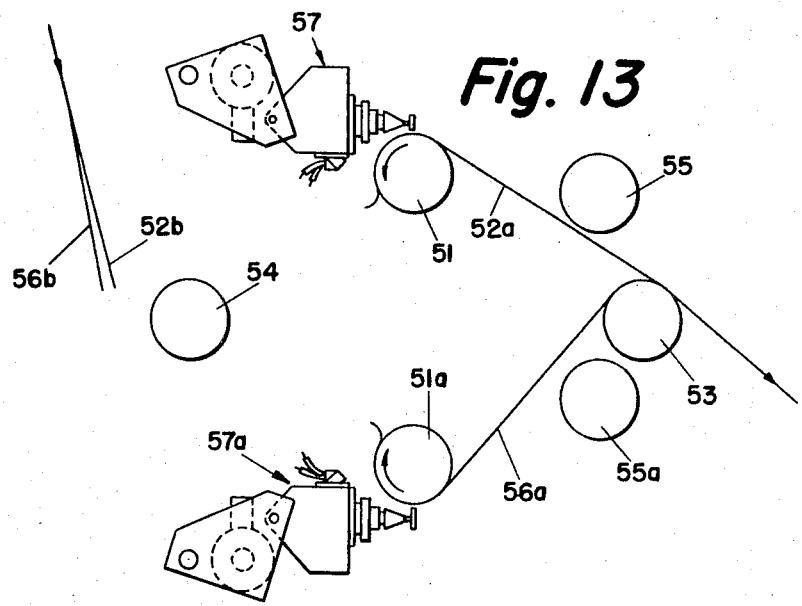

FIGURE 13 is a diagrammatic view revealing the stage in the process of the present invention wherein one end of each of the webs of foil is placed in a position of readiness for the splicing operation.

Figure 14:
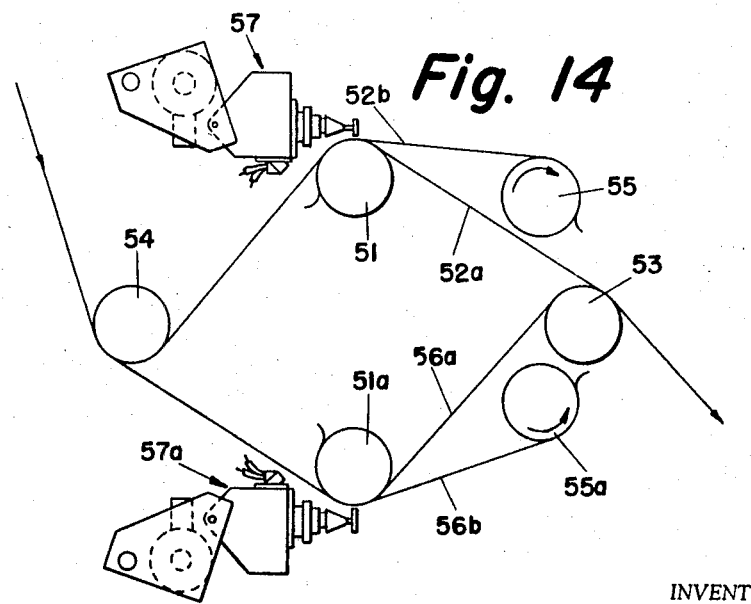

FIGURE 14 is a diagrammatic view revealing a later phase of the process of the present invention than is revealed in FIGURE 13, namely the phase in which both of the discontinuous ends of each of the webs of pack foil are placed in a position of readiness for the splicing operation.

FIGURE 15 is a diagrammatic view revealing a still later phase of the process of the present invention, namely the phase of removing the external tails from the spliced webs.

FIGURE 16 reveals the final phase of the process of the present invention for use with pack foil webs namely the removal of the internal tails from the spliced webs.

FIGURE 17 is a perspective view of a portion of one side of one embodiment of the positioning and splicing apparatus of the present invention for pack foil.

FIGURE 18 is a perspective view of a portion of the other side of the apparatus of the present invention for pack foil.

FIGURE 19 is a sectional view of the apparatus of the present invention for pack foil taken along line 19—19 of FIGURE 17.

FIGURE 20 is a sectional view of the apparatus of the present invention for pack foil taken along line 20—20 of FIGURE 17.

FIGURE 21 is a sectional view of one of the idler-vacuum-tension and anvil rolls of the apparatus of the present invention for pack foil taken along line 21—21 of FIGURE 17.

FIGURE 22 is a sectional view of one of the vacuum-tension rolls of the apparatus of the present invention for pack foil taken along line 22—22 of FIGURE 17.

FIGURE 23 is a diagrammatic view showing a rewind-shear apparatus which includes the positioning and splicing apparatus of the present invention for use with pack foil.

The positioning device 11 of FIGURE 1 comprises a pair of approximately concentric tubes, namely outer tube 13 and inner tube 15 which are radially spaced from each other, e.g., the outer wall of tube 15 is spaced from the inner wall of tube 13. As will be seen from FIGURE 1, the outer tube 13 is perforated throughout its entire periphery about its entire circumference with relatively small holes 17. Holes 17 are arranged in a plurality of rows circumferentially spaced around tube 13 with the holes in each row being spaced longitudinally along tube 13. The inner tube 15 has a plurality of larger holes 19, the area of said holes in aggregate exceeding the area of the holes 17 in tube 13.

One end of the tube 15 is open and is supported as necessary by appropriate supporting means (such as the supporting means described in connection with FIGURE 17 below). The other end of tube 15 is closed. The open end of tube 15 is in communication with exhaust means or a suction source or vacuum pump. Exhaustion of the interior of tubes 13 and 15 through 17 and 19 is accomplished through the action of said suction source.

I have found, for example, that a roller having a length of about three feet can be connected to an ordinary small-size industrial vacuum cleaner (so as to produce a static vacuum of about 20 to 30 inches of water under no-flow conditions) of the type used in machine shops (such as the one-horsepower Multi-Clean unit of the Multi-Clean Products, Inc., of St. Paul, Minnesota), and with perforations of a diameter of between 0.030-inch or 0.040-inch and ⅛-inch spaced more or less on ¾-inch centers around the entire cylindrical periphery of the tube 13, can, when such roller is rotated, tauten a web of aluminum foil having a thickness of between 0.00017-inch and 0.002-inch, if the tube 13 has a diameter of from about two inches to about four inches. Due to the bending stiffness of heavier foils in the as-rolled condition, it may sometimes be advisable to utilize a tube of somewhat larger diameter connected to a stronger vacuum source.

Sometimes it is necessary, if the foil material is very "springy," to press the material against the roller with a pushing element, such as the pushing element 43 in FIGURE 2, which may be a flat plate having a handle. FIGURE 2 is a diagrammatic fragmentary view revealing the use of pushing element 43 in the adjustment of foil on tube 13 of roller 11. The foil does not move in the direction of the arrows, shown in FIGURE 2, during the adjustment, such arrows instead indicating the direction of movement of the pushing element 43 during the adjustment and the direction of movement of the foil during positioning for the adjustment. In this manner, the pushing element 43 overcomes the bending stiffness of the foil and keeps the foil in contact with the roller without moving the foil in respect to the roller.

It will be evident that the positioning device of FIGURE 1 can be utilized in other arrays in which the positioning of webs of such materials as metal, paper, plastics, cloth, etc., would be advantageous, particularly as a preliminary to some other operation, which operation need not be splicing of discontinuous webs. Conventional devices of this type normally move a web over a stationary surface, whereas in the present invention the web is stationary and is tensioned and positioned by the rotation of the roll and the vacuum-produced friction of the web against the surface of the roll.

FIGURE 3 shows one manner in which the positioning device of the present invention may be applied to the positioning of singly-ply webs, and particularly to the preparation of such webs for the splicing operation.

The positioning device 10 of FIGURE 3 comprises a pair of spaced parallel support walls 12 and 14 between which the pivotable positioner 16 is carried.

The positioner 16 comprises the rollers 18 and 20 and the cylindrical anvil 22. The rollers 18 and 20 and the anvil 22 are maintained in spaced and fixedly secured relationship to each other by means of the hollow end supports 24 and 26. The anvil 22 is intermediate the rollers 18 and 20 and evenly spaced from each. The rollers 18 and 20 are disposed on the center line of each of the hollow end supports 24 and 26, but the anvil 22 is offset from the center line of each of the hollow end supports 24 and 26 and is adjacent the edges 25 thereof. Thus, the longitudinal axis of the anvil 22 is offset from the plane passing through the longitudinal axis of rollers 18 and 20.

The positioner 16 is carried intermediate the support walls 12 and 14 by means of the trunnion 28 which extends outwardly from end supports 24 and 26 concentric with the longitudinal axis of the roller 18. Trunnion 28 is supported in bearings by the support walls 12 and 14. Pivotation of the positioner 16 about the trunnion 28 is accomplished by rod 30 which is pivotably secured to the hollow end support 24, and which may be actuated by appropriate known actuating means.

The rollers 18 and 20 are identical in structure, and therefore a description of the roller 18 will be adequate to effect an understanding of the nature of both roller 18 and roller 20. The roller 18 may be of the construction of the positioning device 11 of FIGURE 1, or the roller 18 may introduce a valving action through the particular construction of inner tube 34 of FIGURE 3 and the cooperative operation of tube 32 and tube 34 so as to provide such valving action. Thus, in accordance with FIGURE 3, the outer tube 32 is perforated throughout its entire periphery about its entire circumference with relatively small holes 39. However, the inner tube 34 contains relatively large holes or perforations 38 extending the full axial length of such inner tube 34 but extending for but a fraction of the circumference of such inner tube 34. Thus, the perforations 38 of inner tube 34 extend for but the arcuate portion of the circumference of inner tube 34 that is tended by an angle of appreciably less than 360 degrees, and preferably less than 180 degrees, as for example an angle of 90 degrees or an angle of 120 degrees, or an angle of 135 degrees, the purpose being to localize the locale of the active vacuum ports on the outer periphery of tube 32 and thereby reduce the demand on the suction system. Thus, where the foil contact with the roller is over an arc greater than 180 degrees, the snubbing action associated with high arcuate contact will produce exceptionally high tension in the foil and may cause it to break. Any angle of contact under the influence of the vacuum described in the range of about 90 degrees to 135 degrees has been found to be very practical. Smaller angles of contact are likely to be ineffectual, as not properly holding and tensioning the foil. Those perforations 39 in the outer tube 32 which are not juxtaposed to perforations 38 of inner tube 34 will be blocked by the imperforate portion of the inner tube 34, although some leakage can be expected which does not materially affect the operability of the equipment.

Inner tube 34 is fixedly secured to the end supports 24 and 26 and does not rotate. Outer tube 32 is rotated by means of chain drive 29 connected to sprocket 31 disposed on trunnion 28. A gear train 33 disposed within end support 24 rotates the outer tube 32 of roller 20 simultaneously with the rotation of outer tube 32 of roller 18. The holes or perforations 38 of inner tube 34 are of a substantially larger size than the holes 39 in outer tube 32; they are sufficiently large so that one perforation in inner tube 34 will always subtend at least two holes in a plane normal to the axis in outer tube 32, so that as outer tube 32 rotates all of the holes subtended by the perforated portion of inner tube 34 offer more or less unobstructed ingress for the air flowing toward the suction source 42. End support 26 is a hollow element containing connecting means connecting the inner tubes 34 of rollers 18 and 20 to conduit 40. Conduit 40 is in communication with exhaust means, or suction source, or vacuum pump 42. A wide variety of suction sources may be utilized, and the specific construction of the suction source 42 forms no part of the present invention. Exhaustion of the interior of rollers 18 and 20 is accomplished through the action of suction source 42.

As heretofore indicated, hollow end support 24 contains appropriate gearing mechanism, namely the gear train 33 which is engaged with the rotatable outer tubes 32 of rollers 18 and 20, so that the chain drive 29 operating in connection with sprocket 31 provides for actuation of said gear train 33 so as to cause the revolution of the outer tubes 32 of rollers 18 and 20. A roller drive power switch (not shown) may be used for closing an electrical circuit for actuating the motor which drives the chain drive 29. The rotative speed rate of the outer tubes 32 of rollers 18 and 20 is not critical but should be low; it can be as low as a few revolutions per minute, while a speed of from 15 to 30 revolutions per minute has also been utilized. Higher speeds of rotation serve little purpose, and sometimes accomplish undesirable abrasion. The speeds set forth above have been found to equalize the tension and make the web tauten uniformly and "track" or align itself perpendicularly to the axes of the source of the foil.

The operating of the apparatus 10 of the present invention and the process of the present invention as applied to positioning and splicing of a single-ply foil web may be understood by reference to FIGURES 4 through 10, with the structure disclosed in FIGURE 3 being diagrammatically represented in FIGURES 4 through 10. In the illustrated embodiment, the process of the present invention will be illustrated with aluminum foil, but it is to be understood that other web materials may be used in place of the aluminum foil.

In the schematic view shown in FIGURE 4, the foil source roll and the foil takeup equipment above referred to are not shown. Only the idler rolls guiding the foil through the positioning device 15 of the present invention are shown. The device 16 is shown in its non-use position. The web of the foil is shown passing through the positioning equipment but not in contact therewith. Thus, in FIGURE 4, the foil 46 is passing from idler roll 48 to idler roll 50. The unbroken web of foil 46 passes intermediate the roller 18 and the anvil 22 of device 16, and the web of foil 46 does not engage any part of the device 16. In order to take maximum advantage of the space intermediate the roller 18 and the anvil 22, the device 16 should be disposed in a position approximately 90 degrees to the flow line of the web material. This is accomplished by pivoting the device 16 as aforesaid on the trunnion 28 intermediate the support walls 12 and 14 by actuating rod 30 so that the device 16 is substantially 90 degrees to the flow line of the web material (although as seen in FIGURE 4 it is not necessary that the device 16 be at exactly 90 degrees to the flow line of the web material but only that it be disposed so that the foil is not in contact with the components of device 16). During this stage, the roller drive power switch is off and the roller vacuum switch (which controls suction source 42) is off.

FIGURE 5 illustrates the same equipment shown in FIGURE 4 in the same position but shows it when the entering and leaving foil webs are not connected, as when there has been a break or when one web has come to an end and another must be introduced through the equipment. At such time, the operator should stop the takeup spool (not shown) which removes the material from idler roll 50.

In order to follow the process of the present invention more readily, the portion of the web of foil which depends from idler roll 48 is referred to as web end 46b, and the portion of the web of foil 46 that depends from idler roll 50 is referred to as web end 46a.

As with the stage shown in FIGURE 4, in the stage shown in FIGURE 5 the suction or vacuum source 42 is not energized, and the roller drive power switch is off.

In FIGURE 6, there is shown the stage in which the splicing of the discontinuous web of foil 46 which has two ends 46a and 46b is commenced. The foil web end 46a is introduced through the device 16, passing around the cylindrical anvil 22 and passing around about 170 degrees of the roller 20. As illustrated the rollers 18 and 20 are connected to vacuum pump 42 and roller 20 vacuum-engages the foil web end 46a. The outer tube 32 of roller 20 in the stage shown in FIGURE 6 is stationary and is not rotating. The opposite web end 46b of the discontinuous foil 46 has not yet been introduced into the device 16 by the operator.

During the stage shown in FIGURE 6 the takeup roll is locked, the roller drive power switch is off, and the roller vacuum switch is on.

The device 16 remains stationary while the web end 46b is engaged with the roller 18 by being inserted intermediate roller 18 and anvil 22 and thence onto the roller 18. As with the web end 46a, a portion of the free end portion of web end 46b is unattached to the roller 18, which may be accomplished by having such free end portion juxtaposed to the portion of roller 18 which includes the imperforate portion of inner tube 34. The stage shown in FIGURE 7 is then reached.

In the stage of the process of the present invention shown in FIGURE 7 both of the web ends of the foil 46, namely web ends 46a and 46b are secured in the device 16 with the web ends 46a and 46b being maintained in contact with the outer periphery of the respective rollers 20 and 18 by vacuum. The arrows on the two rollers 18 and 20 indicate that the rollers 18 and 20 have been powered and their outer tubes 32 are rotating at a very low speed. This rotation of the outer tubes 32 causes the foil to tauten uniformly and track but not to break. If the two edges of the web do not line up accurately or track, as the operator may observe, the operator can, by touching the foil on the rollers 18 and 20 very lightly with his fingers, cause it to slide laterally, e.g., to slide back and forth in the direction of the axis of the tension vacuum rolls. The foil tends to assume a position of uniform tension largely free from wrinkles, and the operator can readily see when the proper wrinkle-free, smooth condition has been achieved.

In the stage of the process of the present invention shown in FIGURE 8, the device 10 is pivoted from its 90 degree or other angular position which it assumed in the stages shown in FIGURES 4, 5, 6, and 7 to a position in which it is generally in the plane of the web of flowing foil shown in FIGURE 4. This pivotation is accomplished in a counterclockwise direction, the rod 30 of FIGURE 3 being urged upwardly whereby the device 16 is pivoted counterclockwise from its position of FIGURES 4, 5, 6 and 7 to its position of FIGURE 8. During its pivotation the takeup roll beyond idler roll 50 (the takeup roll is not shown) and the foil source roll (not shown) back of idler roll 48 are maintained stationary.

During this stage, the roller drive power switch may be on (it does not matter), and the roller vacuum switch is on.

The pivotation to the position shown in FIGURE 8 results in the positioning of the web of foil 46 with the web ends 46a and 46b being juxtaposed, aligned, and smoothed in contact around a portion of the anvil 22. At this point, the operator can again observe the smooth, taut condition of the webs and the alignment of their edges. It is most desirable that the portion of the foil which is pressed together over the anvil 22 be smooth and free from wrinkles.

During the stage or phase of the process of my invention shown in FIGURE 8, the web ends 46a and 46b are spliced together. The juncture between the web ends 46a and 46b may be accomplished in a variety of manners.

Thus, the web ends 46a and 46b may be crimped together or coated with a cement, glue, or other chemical adhesive during the phase of my process shown in FIGURE 7, with the juxtaposed portions of such web ends 46a and 46b that are carried on the anvil 22 being so-coated and such adhesive set as by heat or evaporation while the web ends 46a and 46b are engaged with the anvil 22, as in FIGURE 8.

Instead of crimping or chemically adhesively joining the web ends 46a and 46b, such web ends 46a and 46b may be and preferably are metallurgically joined together. This can be accomplished for example by the vibratory welding process disclosed in copending patent application Serial No. 579,779 filed April 23, 1956 by William C. Elmore, Carmine F. DePrisco, and myself, now abandoned, and U.S. Patent 2,946,119 the disclosure of which are incorporated herein. A schematic vibratory welder sonotrode is designated as 47 in FIGURE 8, which, together with its actuating features (not shown) can be used to complete the splice. The welder sonotrode 47 is a seam welder and is rotatably mounted so as to traverse substantially the full width of the web 46. Gear means analogous to those shown in Serial No. 579,779 may be used to effect the aforesaid traverse.

The welding head 47 may include a resonant-disk tip, as described in copending United States patent application Serial No. 747,254 filed July 8, 1958 in the names of William C. Elmore and Carmine F. DePrisco, entitled "Vibratory Device," now Patent 3,017,792, the disclosure of which is incorporated herein by reference. Utilization of such a tip in the apparatus and process of the present invention provides advantages such as those which are cited in said copending application. Although rotary resonant-disk tips are preferred, other types of rolling tips can also be used. Sliding contact of a vibratory tip can be used to effect a vibratory weld between the sheets, although this approach produces inferior junctions between the plies.

When the vibratory welding process above described is utilized in connection with the present invention, at the stage shown in FIGURE 8, the welding head 47 is positioned at one side of the web 46. When the welding head 47 touches the foil web 46, the ultrasonic power is applied. The tip of welding head 47 then traverses the width of web 46. The welding tip of welding head 47 is disengaged just before it runs off the ends of the web 46.

The splicing, such as the aforesaid vibratory welding of the web 46, is normally accomplished across the width of the web 46. While such splicing may be accomplished across a minor portion of the width of the web 46, this is undesirable since in most cases a completely joined or rejoined web is desired.

When the juncture between web ends 46a and 46b is completed, the suction source 42 is disengaged, the roller drive power is stopped, and then the device 16 is pivoted clockwise from its position shown in FIGURE 8 to its position shown in FIGURE 9. In this latter position the device 16 again assumes the disposition which it had in FIGURES 4, 5, 6 and 7. Thus, the web of foil 46 extends intermediate the tensioning roller 18 and the anvil 22. The takeup roll beyond idler roll 50 is then rotated slightly, translating the spliced web from the positioner 16 as shown in FIGURE 9 to a position indicated schematically by the scissors in FIGURE 10. The tails adjacent the spliced portion may then be manually or mechanically cut as, for example, by being torn off against a straight edge, from the spliced web of foil 46. After the removal of such tails, normal operation is resumed, with the web of foil 46 passing from the idler roll 48, intermediate the tensioning roll 18 and the anvil 22, onward over the idler roll 50.

For example, using the apparatus and process of the present invention incorporating a vibratory welder operating at 50,000 cycles per second, with a clamping force associated with the vibratory welder in the range of one pound to twenty pounds, and with an associated power level of 15 to 150 watts, continuous seam welds resembling chalk lines were made across three foot widths of webs of aluminum foil having a thickness of from 0.00017-inch to 0.003-inch at seam welding speeds of approximately 200 inches per minute, with the welding being initiated at room temperature.

The same equipment operating at somewhat lower speeds such as speeds in the range of 10 feet per minute down to one foot per minute, and at the same power level, and at somewhat higher clamping forces such as clamping forces in the range up to about 40 pounds can join foils having a thickness of up to approximately 0.006-inch, with the welding being initiated at room temperature.

The present invention as applied to single-ply positioning and splicing may be embodied in other specific forms without departing from the spirit or essential attributes thereof. For example, pivotation of the positioner and splicer unit is not necessary, and positioning and splicing may be accomplished in the manner shown in FIGURES 11 through 16, wherein the positioner or idler-vacuum-tension rolls also serve as welding anvils, in some cases. It is also possible, for example, to accomplish splices between lapped ends of single-ply foil within the confines of the standard rewind-shear equipment by simply letting the welding head operate against, for example, a standard idler roll used in this case as an anvil.

The operation of the apparatus and the process of the present invention, as used in connection with the positioning and splicing of double-ply or pack foil webs, may be understood by reference to FIGURES 11 through 16, with the structures heretofore disclosed being diagrammatically represented in FIGURES 11 through 16. In the illustrated embodiment, the process of the present invention will be illustrated with aluminum foil, but it is to be understood that other web materials may be used in place of the aluminum foil.

In the schematic view shown in FIGURE 11, which shows normal flow of the foil webs 52 and 56 when there is no need for splicing, the foil supply roll and the foil take-up equipment heretofore referred to are not shown. Only the various components of the positioning and splicing apparatus of the present invention are shown. The two webs of foil 52 and 56 come off the supply roll in close juxtaposition one above the other, much like a single sheet, and, still in close juxtaposition, pass under and in contact with a lower portion of rear idler roll 54, after which the two webs divide, with the upper web 52 passing over and in contact with an upper portion of top idler-vacuum-tension-and anvil roll 51, which is freely rotating as shown by the arrow, thence to and in contact with a side upper portion of front idler roll 53, where it rejoins the lower web of foil 56. The lower web 56 proceeds from rear idler roll 54 to bottom idler-vacuum-tension and anvil roll 51a and passes under and in contact with an under portion of roll 51a, which is freely rotating as shown by the arrow, thence to and in contact with an upper portion of front idler roll 53, where it rejoins upper web 52 on the side upper portion of roll 53. The two-ply web then proceeds to the foil take-up equipment, not shown.

To permit the idler-vacuum-tension and anvil rolls 51 and 51a to rotate freely, they may be provided with clutches or other devices which at this stage are disengaged. At this stage, also, vacuum-tension rolls 55 and 55a are not in use, and welding heads 57 and 57a are not in contact with idler-vacuum-tension and anvil rolls 51 and 51a which are rotating as idler rolls and driven by the action of the moving foil webs. Also, drive motors to effect positioning and tensioning by means of forced-rotation of the various rolls 51, 51a, 55 and 55a, vacuum pumps, and power to the welding heads are not in operation, at this stage.

FIGURE 12 illustrates the same equipment shown in FIGURE 11 in the same position, but shows it when the entering and leaving webs of foil are not connected, as when there has been a break or when one web has come to an end and another must be introduced through the equipment. At such time, the operator should stop the take-up equipment (not shown) which removes the material from front idler roll 53. It should be noted that, in view of the tension on the webs of foil 52 and 56 as they proceed throughout the equipment from supply roll to take-up roll or rolls, a break in one web of foil may cause a break in the other web of foil, so that repair or splicing of both webs will be necessary each time; or, if one web comes to an end whereas the other does not, either a break in the continuous web will occur, or it will be necessary to tear off the continuous web of foil at a region approximating the break region in the discontinuous web, so that both may be spliced at the same time. Thus, it is not possible, as will be readily evident, to "take up the slack" on one web of foil by pulling a section of that web off the idler roll, since the other web will come along too.

In order to follow the process of the present invention more readily, the portion of the web of foil 52 which depends from rear idler roll 54 is referred to as web end 52b, and the portion of the web of foil 52 which depends from front idler roll 53 is referred to as web end 52a. Likewise, the portion of the web of foil 56 which depends from rear idler roll 54 is referred to as web end 56b, and the portion of the web of foil 56 which depends from front idler roll 53 is referred to web end 56a.

As with the stage shown in FIGURE 11, in the stage shown in FIGURE 12 the drive motors are off, the vacuum pumps are off, the tips of the welding heads are not in contact with the idler-vacuum-tension and anvil rolls 51 and 51a which are not rotating, and the power to the welding heads is off.

In FIGURE 13, there is shown the stage of the process of the present invention in which the web ends 52a and 56a are placed in a position of readiness for the splicing operation. In order to do this, the two ply web composed of webs 52 and 56 is back-rolled from the foil take-up unit, so as to permit a supply of sufficient material for back threading of the web ends 52a and 56a through the array of rolls. Back threading consists of passing web end 52a over the front idler roll 53 (and above web 56) up to and over and around top idler-vacuum-tension and anvil roll 51, and in a similar manner, passing web end 56a (which is under web 52) over front idler roll 53 down to and under and around bottom idler-vacuum-tension and anvil roll 51a. To hold the web ends 52a and 56a on the idler-vacuum-tension and anvil rolls 51 and 51a, the vacuum pumps are turned on. The idler-vacuum-tension and anvil rolls 51 and 51a are rotated at a very low speed and only for a short period of time just sufficient to uniformly tauten the webs and to remove substantially all of the wrinkles from the webs. As the idler-vacuum-tension and anvil rolls 51 and 51a are rotated the webs tend to assume a position of uniform tension largely free from wrinkles, and the operator can readily see when the proper wrinkle-free, smooth condition has been achieved, at which time the rotation means is turned off to hold the webs in this condition.

In the state of the process of the present invention shown in FIGURE 14, there is shown the forward-threading of the web ends 52b and 56b through the array so as to place them in readiness for splicing in relation to web ends 52a and 56a respectively, and the subsequent splicing of two plies of web 46 across their width near their ends 52a and 52b, and the splicing of two plies of web 56 across their width near their ends 56a and 56b, said splicing being performed preferably by means of vibratory welding.

At this stage the idler-vacuum-tension and anvil rolls 51 and 51a are locked, the foil take-up unit is still stopped, and the webs having web ends 52a and 56a are still held tautly tensioned.

The double web composed of webs 52 and 56 with respective web ends 52b and 56b is forward-rolled from the supply rolls so as to permit a supply of sufficient material for forward-threading of the web ends 52b and 56b through the array. The lower web 56 with its web end 56b from the foil supply roll is, of necessity and as it comes from the foil supply roll, positioned beneath web 52, and it is passed under rear idler roll 54, then forward and down under bottom idler-vacuum-tension and anvil roll 51a (which already has passing under it the portion of web 56 with web end 56a which was placed there previously), and thence upward and under and around a portion of bottom vacuum-tension roll 55a. In a similar manner, the upper web 52 with its web end 52b (positioned above web 56) is passed under rear idler roll 54 and up to and around a portion of top idler-vacuum-tension and anvil roll 51 (which already has passing over it the portion of web 52 with web 52a which was placed there previously), and thence onward and slightly downward to and around an upper portion of top vacuum-tension roll 55. The web ends 52b and 56b are held on the vacuum-tension rolls 55 and 55a respectively by the action of the exhaust or suction means.

The web supply rolls are locked by simple brake means, not shown, and the rotation means is turned on to rotate the vacuum-tension rolls 55 and 55a in the direction shown by the arrows. The vacuum-tension rolls 55 and 55a are rotated at a very low speed and for a short period of time, just sufficient to apply tension to the webs 52 and 56 and to remove substantially all the wrinkles from the webs. The ends of the webs 52 and 56 are now in position to be spliced together.

The ends of the webs are preferably metallurgically joined together which can be accomplished by the vibratory welding process disclosed in copending patent application Serial No. 579,779 referred to above and Patent No. 2,946,119, the disclosures of which are incorporated herein. The welding tips of the welding heads 57 and 57a are preferably resonant-disk tips of the type described in the previous cited Patent No. 3,017,792. Although rotary resonant-disk tips are preferred, other types of rolling tips can also be used. Sliding contact of a vibratory tip can be used, although this approach produces inferior junctions between the plies.

In order to perform the splicing operation, the tips of welding heads 57 and 57a are moved against the idler-vacuum-tension and anvil rolls 51 and 51a and are held thereagainst by pressure means such as spring pressure means not shown, incorporated in the welding heads. The control switches for the means for traversing the welding head and the welding head operating equipment are then turned on. In order to achieve a uniform weld across the entire width of the webs, the solid portion of the tube 79 of the idler-vacuum-tension and anvil rolls 51 and 51a between the rows of holes 81 should be beneath the welding head tips. Appropriate means for accomplishing this are detailed below. The welding tips traverse the work, across the entire width of the webs, and when they reach the end of the width the traversing means is turned off and the welding heads removed from contact with the idler-vacuum-tension and anvil rolls 51 and 51a.

In the stage of the process of the present invention shown in FIGURE 15, the welding splices have been made and there is shown a method of removing the external "tails." The external "tails" being the respective web end portions past the welded splice area including the web ends 52b and 56b which, until now, have been in place around portions of vacuum-tension rolls 55 and 55a, and which are now excess material not necessary to and, if not removed tending to complicate, subsequent rolling on the take-up equipment as well as subsequent end use of the web material.

In order to perform the tail-removal operation, the web ends 52b and 56b are removed from vacuum-tension rolls 55 and 55a by cutting off the vacuum to the vacuum-tension rolls. The forced rotation means of the idler-vacuum-tension and anvil rollers 51 and 51a are disengaged. Precision cutting blades which are diagrammatically shown at 328 and 330, are brought into contact with the foil next to the edge of the weld lines, whereupon the operator tears off the tails very close to the edge of the weld lines.

FIGURE 16 shows the final stage of the process of the present invention, which is the removal of the internal tails. The foil supply rolls and the foil take-up mechanism are unlocked, and the foil take-up roll is rotated sufficiently to remove the web ends 52 and 56 from the idler-vacuum-tension and anvil rolls 51 and 51a so that they become accessible to the operator. The operator can then remove the web end portions 52a and 56a, such as by cutting along a line close to the edge of the weld lines.

After the removal of the tails, normal operation is resumed as shown and described with regard to FIGURE 11.

The description of FIGURES 11 through 16 shows the apparatus and procedure for delivering two webs of foil over a single idler roll 53. However, it is to be understood that the two plies of foil can proceed through a standard rewind-shear machine in normal fashion and thence to two takeup rolls, as indicated in FIGURE 23. Also the foregoing array can be used for delivering a single web of foil by using only either the top idler-vacuum-tension and anvil roll 51 and top vacuum-tension roll 55, or the bottom idler-vacuum-tension and anvil roll 51a and the bottom vacuum-tension roll 55a. In addition, it will be apparent that other patterns of arrangement of the idler and vacuum-tension and anvil are possible, as to fit within an area of a certain size or to accommodate to the requirements of a particular rewind-shear operation.

FIGURES 17 through 22 show an embodiment, which is not necessarily a preferred embodiment, of a vibratory welding machine incorporating apparatus of the present invention, as applied to the positioning and splicing of pack foil.

The positioning and splicing apparatus 60 comprises a base 62 having a front wall 64, a back wall 66, and side walls 68 and 70 secured to the base 62. Side walls 68 and 70, which are substantially identical, have upwardly extending mounting arms 72 and 74 respectively adjacent front wall 64, and upwardly extending mounting arms 76 and 78 respectively adjacent back wall 66. Rear mounting arms 76 and 78 are provided with top extensions 76a and 78a respectively extending substantially downwardly and forwardly therefrom, and with intermediate extensions 76b and 78b respectively extending substantially upwardly and forwardly therefrom.

A first idler roll shaft 61 having an idler roll 54 rotatably mounted thereon is mounted between rear mounting arms 76 and 78 intermediate the forwardly extending extensions thereof. A second idler roll shaft 63 having an idler roll 53 rotatably mounted thereon is mounted between front mounting arms 72 and 74 at substantially the same level as first idler roll 54. A top idler-vacuum-tension and anvil roll 51 is mounted between top extensions 76a and 78a and a bottom idler-vacuum-tension and anvil roll 51a is mounted between the intermediate extensions 76b and 78b below idler roll 54. A top vacuum-tension roll 55 is mounted between the front mounting arms 72 and 74 adjacent the top ends thereof. A bottom vacuum-tension roll 55a is mounted between front mounting arms 72 and 74 below idler roll 53 but at a level slightly above bottom idler-vacuum-tension and anvil roll 51a. A top welding head supporting and guide shaft 63 is supported between rear mounting arms 76 and 78 adjacent the tops thereof and carries a welding head 57 which extends over top idler-vacuum-tension and anvil roll 51. A bottom welding head supporting and guide shaft 63a is supported between rear mounting arms 76 and 78 adjacent intermediate extension 76b and 78b, and carries a welding head 57a which extends beneath the bottom idler-vacuum-tension and anvil roll 51a.

Referring to FIGURE 21, top idler-vacuum-tension and anvil roll 51 comprises an inner hollow tube 65 having a plurality of radially extending holes 67 therethrough. Holes 67 are arranged in a plurality of rows circumferentially spaced around tube 65 with the holes in each row being spaced longitudinally along tube 65. One end of tube 65 is open and is supported in a collar 58 which is secured to the inside of inwardly extending extension 78a by bolts 59, only one of which is shown. The other end of tube 65 is closed by a plug 71 having a central threaded hole 73. A rod 75 has a threaded end 77 threaded into plug hole 73. Rod 75 extends longitudinally from tube 65 through a hole 80 in inwardly extending extension 76a and is supported on extension 76a by a clutch device, generally designated as 82, in a manner which will be described. An inlet tube 84 extends through a hole 86 in flange 78a and fits into the open end of tube 55. Inlet tube 84 has an annular flange 88 brazed or welded thereto which is secured to the outside of flange 78a by bolts 90. The space between inlet tube 84 and tube 55 is sealed by a gasket 92. A tube 79 fits around tube 65 and has a plurality of radially extending holes 81 therethrough which are smaller in diameter than holes 67. Holes 81 are arranged in a plurality of circumferentially spaced rows with the holes in each row being spaced longitudinally along sleeve 79. One end of sleeve 79 is rotatably mounted on tube 65 by a sealed ballbearing 98. A bushing 100 is force-fitted in the other end of sleeve 79 and is rotatably supported on the closed end of tube 65 by a ballbearing 102. Bushing 100 has a central hole 104 therethrough through which rod 75 extends and the space between bushing 100 and rod 75 is sealed by a packing gland 106. The outer end of bushing 100 is rotatably supported in a supporting collar 108 by a ballbearing 110, and supporting collar 108 is secured to the inside of extension 76a by bolts 112.

Clutch 82 comprises a sleeve 114 surrounding rod 75 and extending through hole 80 in flange 76a. Clutch sleeve 114 is slidably supported in a bearing 116 which is secured to the outside of extension 76a by bolts 118. A cap 120 slidably fits around the outer end of sleeve 114 and a cylinder 122 surrounds sleeve 114 between cap 120 and bearing 116. Bolts 124 secure cap 120 and cylinder 122 to bearing 116. A piston 126 surrounds sleeve 114 within cylinder 122 to bearing 116. A piston 126 surrounds sleeve 114 within cylinder 122 and is secured to sleeve 114 by a setscrew 128. Piston 126 is provided with piston packing rings 130 to seal the space between the piston 126 and the inner surface of cylinder 122. Cap 120 is provided with a central hole 132 through its end through which rod 75 extends and a nut 134 is threaded on the end of rod 75 to secure the rod to cap 120. Cap 120 is also provided with an air inlet passage 136 extending to one side of piston 126. Cylinder 122 is provided with an air passage 138 opening to the other side of piston 126. A sprocket wheel 142 is mounted on the inner end of sleeve 114 within supporting collar 108, and a drive pin 144 extends longitudinally from a ring 146 mounted on sprocket wheel 142. Drive pin 144 is in alignment with a hole 148 in drive ring 150 which is mounted in bushing 100. Drive ring 150 is connected to rotate with bushing 100 by a dowel pin 152.

Bottom idler-vacuum-tension and anvil roll 51a is identical in structure to top idler-vacuum-tension and anvil roll 51 as described above, and is mounted between extensions 76b and 78b in the same manner that top idlervacuum-tension and anvil roll 51 is mounted between extensions 76a and 78a.

Referring to FIGURE 19, idler-vacuum-tension and anvil rolls 51 and 51a are driven by an electric motor 154 through a standard speed control mechanism 156. An endless drive chain 158 connects the drive sprocket wheel 162 of bottom idler-vacuum-tension and anvil roll 51a to a sprocket wheel 160 on the end of the output shaft of speed control mechanism 156. Drive chain 158 passes over drive sprocket wheel 164 and tension sprocket wheel 166 which are rotatably mounted on mounting arm 76. Drive sprocket wheel 164 drives a sprocket wheel, not shown, which is connected by endless drive chain 168 to a sprocket wheel 170 rotatably mounted on mounting arm 76. Sprocket wheel 170 rotates a gear 172 which meshes with a second gear 174 which is rotatably mounted on mounting arm 76. Gear 174 drives a sprocket wheel 176 which is connected to the sprocket wheel 142 of top idler-vacuum-tension and anvil roll 51 by an endless drive chain 178. Drive chain 178 extends over tension sprocket wheels 180 and 182. A cam wheel 184 having a plurality of circumferentially spaced notches 184a in its outer edge is rotatably mounted on mounting arm 76 and is driven by drive chain 158 through a sprocket wheel 186. A switch 188 is mounted on mounting arm 76 and has a roller 190 on the end of its operating arm 192 riding on the outer edge of cam 184. Switch 188 is positioned so that when roller 190 is in a notch 184a the switch is closed and when roller 190 is on the edge of cam 184 between the notches 184a the switch is open. Switch 188 is connected in the operating circuit for welding heads 57 and 57a as will be explained later. Motor 154 is connected so that it will drive bottom idler-vacuum-tension and anvil roll 57a in the direction of arrow 194 and will drive top idler-vacuum-tension and anvil roll 51 through gears 172 and 174 in the direction of arrow 196.

Vacuum-tension rolls 55 and 55a are identical in structure and in the manner in which they are mounted between mounting arms 72 and 74, and therefore a description of top vacuum-tension roll 55 will be adequate to effect an understanding of the nature of both vacuum-tension roll 18a and vacuum-tension roll 55a.

Referring to FIGURE 2, vacuum-tension roll 55 comprises a hollow tube 83 having a plurality of radial holes 85 therethrough. Holes 85 are arranged in a plurality of circumferentially spaced rows with the holes in each row being spaced longitudinally along tube 83. One end of tube 83 is supported in a collar 202 secured to the inner surface of mounting arm 74 by bolts 204. The other end of tube 83 is supported on the end of a rotatable shaft 206 by a ballbearing 208. The other end of shaft 206 is rotatably supported in a collar 210 by a ballbearing 212. Collar 210 is secured to the inner surface of mounting arm 72 by bolts 214. An inlet tube 216 extends through a hole 218 in mounting arm 74 and fits into the end of tube 83. The space between inlet tube 216 and tube 83 is sealed by a gasket 220. Inlet tube 216 has an annular flange 222 brazed or welded thereto, and flange 22 is secured to the outer surface of mounting arm 74 by bolts 224. A sleeve 87 having a plurality of radially extending holes 89 therethrough surrounds tube 83. Holes 89 are smaller in diameter than holes 85 and are arranged in a plurality of circumferentially spaced rows with the holes in each row being spaced longitudinally along the sleeve 87. One end of sleeve 87 is rotatably supported on tube 83 by a sealed ballbearing 230. A bushing 232 is force-fitted into the other end of sleeve 87 and is force-fitted onto shaft 206 so that sleeve 87 will rotate with the shaft 206. A gear 234 is mounted on shaft 206 adjacent ballbearing 212 and is secured to shaft 206 by a through-pin 236.

Referring to FIGURE 19, vacuum-tension rolls 55 and 55a are driven by an electric motor 238 through a standard speed control mechanism 240. An endless drive chain 242 connects a sprocket wheel 244 on the end of the output shaft of speed control mechanism 240 to a sprocket wheel 246 rotatably mounted on mounting arm 72 and passes around a pair of guide and tension sprocket wheels 248 and 250. Sprocket wheel 246 drives another sprocket wheel, not shown, which is mounted on the same shaft as sprocket wheel 246, and the driven sprocket wheel is connected by an endless drive chain 252 to a sprocket wheel 254 rotatably mounted on mounting arm 72 adjacent the top vacuum-tension roll 55. Drive chain 252 also extends around sprocket wheel 256 of the bottom vacuum-tension roll 55a so as to drive the vacuum-tension roll 55a. Sprocket wheel 254 drives a gear 258 which meshes with the gear 234 of top vacuum-tension roll 55. Electric motor 238 is connected to drive bottom vacuum-tension roll 55a in the direction of arrow 260, and to drive top vacuum-tension roll 18a through gear 258 in the direction of arrow 262.

Welding heads 57 and 57a are identical in structure and the manner in which they are mounted, except that bottom welding head 57a is mounted in reverse position as to top welding head 57 so that top welding head 57 acts downwardly whereas bottom welding head 57a acts upwardly. Referring to FIGURE 20, the welding heads 57 and 57a in general comprise mounting brackets 264 and 264a which are slidably mounted on supporting and guide shafts 63 and 63a respectively. Threaded worm shafts, not shown, which are rotatably mounted between mounting arms 76 and 78 extend through mounting brackets 264 and 264a and mesh with an internal worm thread therein to move the mounting brackets longitudinally along the guide shafts 63 and 63a. Welding tip carrying members 268 and 268a are pivotably connected to mounting brackets 264 and 264a respectively. Welding tips 272 and 272a extend from the welding tip carrying members 268 and 268a with the top welding tip 272 extending over top idler-vacuum-tension and anvil roll 51, and bottom welding tip 272a extending beneath the bottom idler-vacuum-tension and anvil roll 51a. Welding tips 272 and 272a may be and preferably are the resonant-disk type, described in copending United States patent application Serial No. 747,254 filed July 8, 1958 in the names of William C. Elmore and Carmine F. DePrisco, entitled "Vibratory Device," now Patent 3,017,792, the disclosure of which is incorporated herein by reference. Utilization of such a tip in the apparatus and processs of the present invention provides advantages such as those which are cited in said copending application. Although rotary resonant-disk tips are preferred, other types of rolling tips or sliding tips may also be used although sliding tips may be expected to provide inferior splices. Mounted on the bottom of the top welding tip carrying member 268 and on the top of the bottom welding tip carrying member 268a are photocell control devices 276 and 276a respectively. Each of the photocell control devices 276 and 276a comprises a source of light, such as a small electric light bulb, arranged to shine a small beam of light substantially normal to the respective foil webs 52b and 56b and a photocell mounted next to the source of light and arranged to pick up any reflection of the beam of light. The photocells are connected in the welding tip control circuit was will be explained later. The welding heads 57 and 57a are driven along the guide shafts 63 and 63a by an electric motor 280 through a standard speed control device 282. An endless drive chain 284 connects sprocket wheels 286 and 288 on the respective welding head drive worm shafts to a sprocket wheel 290 on the output shaft of speed control device 282. Thus, motor 280 will simultaneously rotate both of the welding head drive worm shafts to move both of the welding heads 57 and 57a simultaneously along the guide shafts 63 and 63a.

A pair of electrically driven vacuum pumps 292 and 294 (FIGURE 18) are mounted on a platform 296 secured between the walls of the positioning and splicing apparatus 60. Vacuum pump 292 is connected by a hose 298 to the inlet tube 84 and top idler-vacuum-tension and anvil roll 51 and to the inlet tube 84a of bottom idlervacuum-tension and anvil roll 51a. Vacuum pump is connected by a hose 300 to the inlet tube 216 of top vacuum-tension roll 55 and to the inlet tube 216a of bottom vacuum-tension roll 55a. A control panel 306 is mounted on side wall 68 and contains the necessary switches for operating the various mechanisms of the positioning and splicing apparatus 60.

FIGURE 23 shows the positioning and splicing apparatus of the present invention as used as part of a rewind mechanism. The rewind mechanism includes a supply roll 310 rotatably mounted on a platform 312 which is located to the rear of positioning and splicing apparatus 60. The webs of foil 52 and 56 from supply roll 310 together pass under rear idler roll 54 of the positioning and splicing apparatus 60. The top foil 52 is then fed over top idler-vacuum-tension and anvil roll 51, while the bottom foil 56 is fed under the bottom idler-vacuum-tension and anvil roll 51a. The two foils 52 and 56 are then brought together again and are fed over front idler roll 53. The two ply foil then passes around a pair of guide rolls 318 and 320 to take-up rolls 322 and 326 which are rotatably supported on a table or like platform 324. The drive rolls 332 and 333 are rotated by a suitable source of power, not shown, and engage rewind roll 326, rotating the rewind rolls 322 and 326, thereby pulling the foils 52 and 56 from the supply roll 310 through the positioning and splicing apparatus and the rewind mechanism.

The operation of the apparatus 60 of the present invention and the process of the present invention in connection with the positioning and splicing of pack foil as it could be conducted in an arrangement such as that of FIGURES 17 through 23, has been outlined in the description of FIGURES 11 through 16.

In connection with FIGURE 11 in relation to FIGURES 17 through 23, disengagement of the clutches 82 of the idler-vacuum-tension and anvil rolls is accomplished, when desired, by feeding air under pressure into cylinder 122 through air passage 138. The air acts against piston 126 to move the piston to the left as shown in FIGURE 21. This in turn moves sleeve 114 and drive pin 144 to the left so that drive pin 144 is disengaged from hole 148 to permit the anvil sleeve 79 to rotate freely.

In connection with FIGURE 13 in relation to FIGURES 17 through 23, turning on of vacuum pump 292 draws air through the holes 81 in the tubes 79 of the idler-vacuum-tension and anvil rolls and produces a sufficient suction on the surface of the tubes 79 to hold the web ends 52a and 56a to the idler-vacuum-tension and anvil rolls 51 and 51a. At the same time the vacuum pumps are turned on the clutches 82 of the idler-vacuum-tension and anvil rolls 51 and 51a are engaged by admitting air under pressure through a cap (air inlet) passage 136 to engage the piston 126. This moves piston 126 to the right, as shown in FIGURE 21, along with sleeve 114 and drive pin 144 so as to move drive pin 144 into drive ring hole 148. With the take-up unit being braked by a suitable braking mechanism, not shown, motor 154 is then turned on to rotate idler-vacuum-tension and anvil rolls 51 and 51a in the directions shown by the arrows and thus tension the foil.

In connection with FIGURE 14 in relation to FIGURES 17 through 23, the web ends 52b and 56b are held on the vacuum-tension rolls 55 and 55a respectively by the suction produced on the surface of tube sleeve 87 of the vacuum-tension rolls by the vacuum pump 294 drawing air through the holes 89 in the tube 87.

In connection with the splicing operation, and in order to insure that the solid portion of the tubes 79 of the idler-vacuum-tension and anvil rolls 51 and 51a between the rows of holes 81 is beneath the welding tips 272 and 272a, switch 188 is connected into the control circuit of motor 280, and cam 184 is positioned so that when cam follower roller 190 is in a notch 184a, thereby closing switch 188, the tubes 79 are in the proper position for welding. If motor 280 does not operate when its operating switch is turned on because switch 188 is open due to cam follower roller 190 not being in a notch 184, it is necessary to rotate the idler-vacuum-tension and anvil rolls 51 and 51a a few degrees until switch 188 is closed. The welding tips are then simultaneously traversed across the idler-vacuum-tension and anvil rolls 51 and 51a. The photocell control devices 276 and 276a are connected in the welding tip operating circuit so that unless the photocells receive reflective light from the light source the welding tips will not operate. Thus, the welding tips 272 and 272a will not operate until they reach the side of the webs, at which time the light will be reflected from the surface of the webs of foil onto the photocells to activate the welding tips 272 and 272a. When the welding tips 272 and 272a reach the other side of the webs, the vibratory welding power is cut off by the photocell control devices 276 and 276a.

In connection with the vibratory welding of pack foil, it should be noted that a single welding head may suffice, with the discontinuous ends of both plies spliced on one anvil, if for example, the lower ply ends are lapped over the anvil first and spliced and, after such splicing, a shim of metal, paper, or other material is placed over the spliced ply resting on the anvil before the ends of the upper ply of foil are lapped over the lower spliced ply and shim and then spliced. Insertion of the shim between plies prevents splicing together of upper and lower plies. Hereinafter, the anvils referred to above such as anvil 22 may be referred to an anvil member.

The present invention may be embodied in other specific forms without departing from the spirit or essential attributes thereof, and, accordingly, reference should be made to the appended claims rather than to the foregoing specification as indicating the scope of the invention.

I claim:

1. The process for splicing a discontinuous web which includes the steps of operatively anchoring a first free end of the web around and to an anvil member, rotating said anvil member to tauten the first free end of the web, passing the second free end of the web around the anvil member, and in contact with the first free end of the web, to a second member, operatively anchoring said second free end to said second member, rotating said second member to tauten the second free end of the web, joining together the portions of the ends of the web which are in contact on the anvil member, and releasing the anchored portions of the joined web.

2. A process in accordance with claim 1 including trimming the released former free ends of the web after said joining step.

3. A process in accordance with claim 1 in which the web is aluminum foil, and metallurgically joining said ends together by said joining step.

4. A process in accordance with claim 3 in which vibratory welding is used to join the first and second web ends together.

5. A process in accordance with claim 4 in which the vibratory welding effects a vibratory seam weld which extends across the width of the web portions, with said vibratory welding being accomplished when the contacting web portions are tautened on the anvil.

6. A process for splicing a pair of discontinuous webs which includes the steps of passing a first free end of one of said webs over and around a first anvil member, passing a first free end of the other of said webs under and around a second anvil member, operatively anchoring said first free ends to their respective anvil members, rotating said anvil members to tauten the first free ends of said webs, passing the second free ends of said one web over the first anvil member, and in contact with the first free end of said one web, to a first tension member, passing the second free end of said other web under said second anvil member and in contact with the first free end of said other web to a second tension member, operatively anchoring said second free ends to their respective tension member, rotating said tension members to tauten the second free ends of the webs, joining together the portion of the ends of said one web which are in contact on the first anvil member, joining together the portions of the ends of said other web which are in contact on the second anvil member, and releasing the anchored portions of the joined webs.

7. A process in accordance with claim 6 in which the second ends of said webs are released first and trimmed from the joined webs adjacent the junction, the first free ends of said webs are then released, the joined webs are moved to remove the first ends away from the anvil members, and the first ends are trimmed adjacent the junctions.

8. A process in accordance with claim 6 in which the webs are aluminum foil and the ends of the webs are metallurgically joined together.

9. A process in accordance with claim 8 in which vibratory welding is used to join the portions of each of the webs together.

10. A process in accordance with claim 9 in which the vibratory welding effects a vibratory seam weld which extends across the width of the web portions, with said vibratory welding being accomplished when the contacting web portions are tautened on the anvil members.

11. A process for joining the free ends of sheet material comprising unwinding a web of metal foil having a thickness of less than about .006 inch, passing the foil between an anvil extending transversely across the web path and a vibratory welder mounted for movement substantially parallel to the longitudinal axis of said anvil, joining free ends of said metal foil with a non-fusion metallurgical joint lacking a cast structure, said joining step including overlapping the free ends so that an overlapped portion thereof constituting the intended weld zone is juxtaposed to the anvil, smoothing the overlapped portion at the intended weld zone so that it is wrinkle-free, applying a force to hold the overlapped portions at the intended weld zone in intimate contact against the anvil, contacting one of the free ends at the intended weld zone with a vibratory welder, and moving the vibratory welded in contact with one of the free ends at the intended weld zone along a path substantially parallel to the longitudinal axis of the anvil, and then winding up the thusly-joined web of metal foil.

12. A process in accordance with claim 11 wherein said free ends are free ends of a discontinuous web of aluminum foil.

13. A process in accordance with claim 11 including the step of removing the excess material of the metal foil between the joint and the extremities of the free ends.

14. A process in accordance with claim 11 including detecting the side edges of the metal foil, and operating said vibratory welder when said detecting step indicates that a welding tip on said vibratory welder is in contact with one of said free ends.

15. A method in accordance with claim 14 wherein said detecting step is accomplished photoelectrically.

References Cited by the Examiner
UNITED STATES PATENTS

| | | | |
|---|---|---|---|
| 2,446,148 | 7/48 | Weightman | 219—82 |
| 2,978,805 | 4/61 | Greenberger | 29—493 |

JOHN F. CAMPBELL, *Primary Examiner.*

WHITMORE A. WILTZ, *Examiner.*